W. KRAMER.
CLICK MECHANISM FOR FISHING REELS.
APPLICATION FILED MAR. 24, 1910.

996,348.

Patented June 27, 1911.

WITNESSES

INVENTOR
William Kramer
BY
ATTORNEY

UNITED STATES PATENT OFFICE.

WILLIAM KRAMER, OF BROOKLYN HILL, NEW YORK.

CLICK MECHANISM FOR FISHING-REELS.

996,348.  Specification of Letters Patent.   Patented June 27, 1911.

Application filed March 24, 1910.  Serial No. 551,372.

*To all whom it may concern:*

Be it known that I, WILLIAM KRAMER, a citizen of the United States, and a resident of Brooklyn Hill, in the county of Queens and State of New York, have invented certain Improvements in Click Mechanism for Fishing-Reels, of which the following is a specification.

This invention relates to certain improvements in click mechanism for fishing reels such as are employed by anglers, and the object of the invention is to provide a click mechanism of an improved and simplified construction and partially automatic in operation, whereby the angler may more readily control the line in the operation of playing a game fish.

The invention consists in certain novel features of the construction, and combinations and arrangement of the several parts of the improved click mechanism, whereby certain important advantages are attained, and the device is rendered simpler, less expensive, and otherwise better adapted and more convenient for use, all as will be hereinafter fully set forth.

The novel features of the invention will be carefully defined in the claims.

Figure 1:
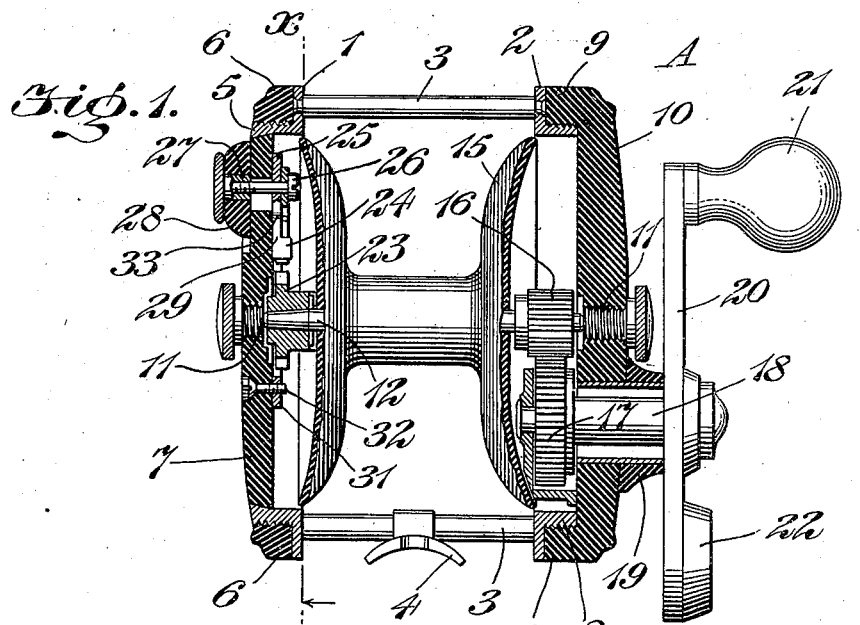
Figures 2, 3:
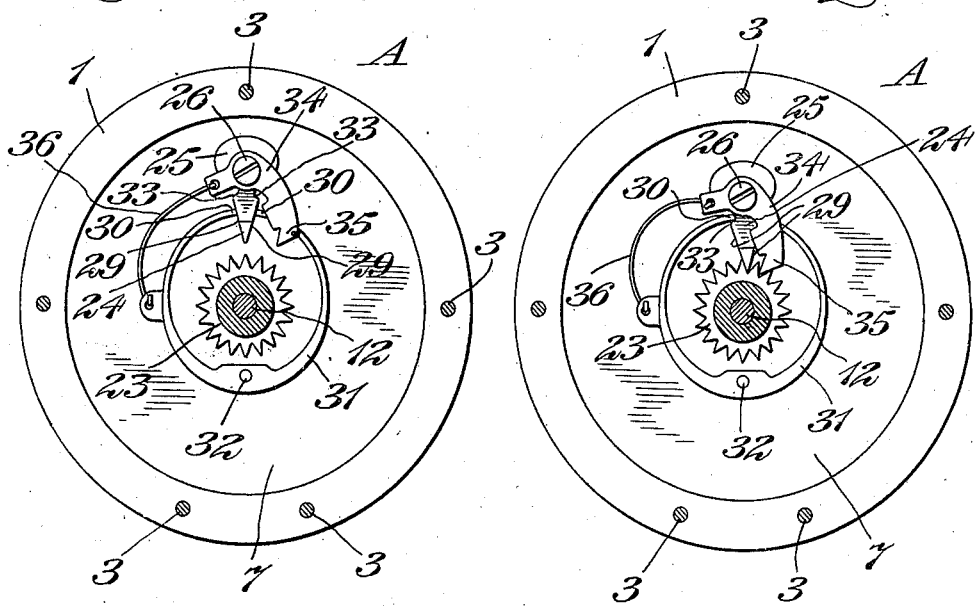

In the accompanying drawings which serve to illustrate my invention—Figure 1 is a fragmentary vertical section through a reel embodying my improvements; Fig. 2 is a vertical section taken in the plane indicated by the line $x$—$x$ in Fig. 1, and illustrating the click mechanism, said mechanism being shown adjusted out of position for operation, and Fig. 3 is a vertical section similar to Fig. 2, but showing the click mechanism adjusted in operative position.

Referring more particularly to the drawings, A represents a reel having a metallic cage-like frame consisting of two annular bands or rings 1 and 2, spaced apart and connected by means of tie-bars 3, 3 arranged at suitable intervals, the ends of said tie-bars being reduced and passed through apertures in the bands or rings 1 and 2, and being riveted upon the outer faces thereof to afford a rigid connection between the parts. The concaved metal plate 4 is held upon the tie-rods 3 at one side of the reel allowing the same to be secured in a usual manner to the reel-seat of the fishing rod.

The annular band or ring 1 is provided with an outwardly directed annular flange 5 which is externally screw-threaded to receive upon its perimetral surface a ring 6 of hard rubber, while the inner surface of said flange, adjacent to its outer edge, is of a conical formation and is adapted to receive an end plate 7 also formed of hard rubber, which is tightly fitted within said conical portion of the ring 1 in such a manner as to securely close that end of the reel. The annular band or ring 2 is also provided with an outwardly directed annular flange 8 which is exteriorly screw-threaded to receive an annular edge flange 9 upon a hard rubber end plate 10 which is thus adapted to tightly close the end of the reel opposite to the end plate 7.

The opposite end plates 7 and 10 are provided with centrally located and alined bearing pieces 11, 11 which are externally screw-threaded for engagement with correspondingly screw-threaded apertures at the central parts of the respective end plates. The spool shaft 12 has its opposite ends journaled in the bearing pieces 11, 11 and carries at its middle portion a spool 15 secured to the spool shaft 12 in any suitable manner.

The spool shaft 12 carries at its end adjacent to the end plate 10, and at the inner side of said end plate, a gear pinion 16 which is adapted to be engaged by a spur gear wheel 17 which is capable of turning movement upon the inner end of an actuating shaft 18 which is extended through a boss 19 formed upon the end plate 10, and to the outer end of which is secured an actuating lever or crank 20 one end whereof is provided in a well known way with a crank handle 21 while the opposite end thereof is provided with a usual form of counterbalance 22.

A click wheel 23 is secured upon the end of the spool shaft opposite to the pinion 16, and 24 represents a click pawl, held upon a member 25 mounted for sliding movement in a radial direction across the inner surface of the end plate 7, toward and from the teeth of the click wheel, so as to be capable of movement in and out of engagement with said teeth. The member 25 is held by a screw 26 extended for movement in a radial slotted opening in the end plate 7, the outer end of said screw being engaged in a stud 27 carrying a thumb-piece 28 adapted to be pressed by the angler for movement of the click pawl into engagement with the teeth of the click wheel, and said thumb-piece 28 being of a diameter to effectively close the slotted opening through which said screw 26 plays at all times, to prevent the entry of water or grit.

The click pawl 24 has opposite beveled surfaces 29, 29 adjacent to its tip, and said surfaces are adapted to be engaged by the extremities 30, 30 of a circular spring 31 held by means of a screw 32 to the end plate 7 at a point opposite to the click pawl 24 and so arranged as to encircle the click wheel 23 when the parts of the reel are assembled. By the contact of the ends 30 of said spring upon the beveled surfaces 29, 29 of the click pawl, said pawl is normally held out of engagement with the teeth of the click wheel, as in the position shown in Fig. 2, but when the thumb-piece 28 is pressed toward the spool shaft by the angler the beveled surfaces 29, 29 are caused to press between the ends 30, 30 of the circular spring, whereupon said ends of the spring are brought into engagement with seats 33, 33 at opposite sides of the pawl so that the tension of the circular spring is thereafter exerted to hold the pawl in engagement with the teeth of the wheel despite the turning movement of the latter.

So far as described, there is no particular novelty in the construction and arrangement of the click device, but it will be understood that said device is desirable as affording a means for securing the requisite tension on the line when playing a game fish. But in connection with the click device constructed as above described I provide means for releasing and throwing the same out of operation as soon as the angler shall have commenced to reel in the line. This means comprises a lifting dog or pawl 34, pivotally held upon the screw 26, having a jaw 35 adapted to engage one of the teeth of the click wheel in advance of the teeth engaged by the click pawl when the member 25 is moved radially inward to engage said click pawl with the teeth of said click wheel, as shown in Fig. 3, so that in case of rearward movement of the click wheel, such as would be caused by backward movement of the spool shaft under the control of the angler in reeling in the line, the lifting pawl or dog 34 is thrown outwardly, carrying with it the click pawl 24 which is thereby caused to disengage itself from the teeth of the click wheel and to disengage the ends 30, 30 of the circular spring 31 from the seats 33, 33, whereby said spring is permitted to exert its tension upon the beveled surfaces 29, 29 of the click pawl to maintain the same out of operation. A spring 36 is provided for holding the pivoted lifting pawl in such position that its jaw shall properly engage with the teeth of the click wheel when the click device is adjusted in operative position.

From the above description it will be seen that the improved click mechanism constructed according to my invention is of an extremely simple and comparatively inexpensive nature, and is particularly well adapted for use by anglers, by reason of the automatic character of its operation in disengaging the click wheel, and it will also be obvious from the above description that the device is susceptible of considerable change without material departure from the principles and spirit of the invention, and for this reason I do not desire to be understood as limiting myself to the precise form and arrangement of the several parts herein set forth in carrying out my invention in practice.

Having thus described my invention, what I claim and desire to secure by Letters Patent is:

1. In a fishing reel having a spool mounted to turn, a click wheel driven from the spool, a click pawl movable in and out of engagement with the click wheel and a lifting pawl engageable with the teeth of the click wheel and movable on backward rotation thereof, and connected with the click pawl to disengage the same from the teeth of the click wheel.

2. In a fishing reel having a spool mounted to turn, a click wheel, a reciprocating click pawl movable in and out of engagement with said wheel, means connected with the click pawl actuated from back rotation of the spool for moving the click pawl in one direction out of engagement with the click wheel and extensible means for holding the click pawl into or out of operative position.

3. A fishing reel having a spool mounted to turn, a click wheel, a click pawl movable in and out of engagement with the click wheel and a lifting pawl pivoted to the click pawl engageable with the teeth of the click wheel and movable on backward rotation thereof to disengage the same from the teeth of the click wheel.

4. A fishing reel having a spool mounted to turn, a click wheel, a click pawl movable in and out of engagement with the click wheel and a spring controlled lifting pawl pivoted to the click pawl engageable with the teeth of the click wheel and movable on backward rotation thereof to disengage the same from the teeth of the click wheel.

5. In a fishing reel having a spool mounted to turn, click mechanism actuated from said spool when the same is turned in one direction, including a click wheel connected with the spool and a click pawl engageable therewith and means actuated from reverse rotation of the spool for throwing the click mechanism out of operation, including a device actuated from movement of the click wheel operatively connected with the click pawl to withdraw the same from engagement with the click wheel.

6. In a fishing reel having a spool mounted to turn, click mechanism actuated from said spool when the same is turned in one direction and including a click pawl adjustable into and out of operative position, means actuated from reverse rotation of the spool for adjusting the click pawl out of operative position and resilient means engageable with the click pawl to hold the same either in operative position or in inoperative position.

In witness whereof I have hereunto signed my name this 25th day of February 1910, in the presence of two subscribing witnesses.

WILLIAM KRAMER.

Witnesses:
 WILFRED E. LAWSON,
 W. C. ABBOTT.

---

Copies of this patent may be obtained for five cents each, by addressing the "Commissioner of Patents, Washington, D. C."